(No Model.)

N. C. BASSETT.
DIFFERENTIAL NUT FOR SECURING PINIONS ON SHAFTS.

No. 454,019. Patented June 16, 1891.

Witnesses
S. B. Thompson

Inventor
Norman C. Bassett
by Burtley Knight
Atty

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

DIFFERENTIAL NUT FOR SECURING PINIONS ON SHAFTS.

SPECIFICATION forming part of Letters Patent No. 454,019, dated June 16, 1891.

Application filed March 20, 1891. Serial No. 385,746. (No model.)

*To all whom it may concern:*

Be it known that I, NORMAN C. BASSETT, a citizen of the United States, residing at Lynn, in the county of Essex and State of Massachusetts, have invented a certain new and useful Improvement in Differential Nuts for Securing Pinions on Shafts, of which the following is a specification.

My invention relates to a device for forcing a pinion, gear, or like torque-conveying device onto the end of the shaft of a driving or driven apparatus—for example, the shaft of an electric-motor armature. To this end I fit the shaft and pinion to one another by a taper joint, secure the pinion from rotation on the shaft by a key or feather, and employ a differential nut engaging with both the shaft and the pinion to force the pinion endwise on the shaft. Finally I lock the nut against backward rotation by means of a nut-lock.

Figure 2:
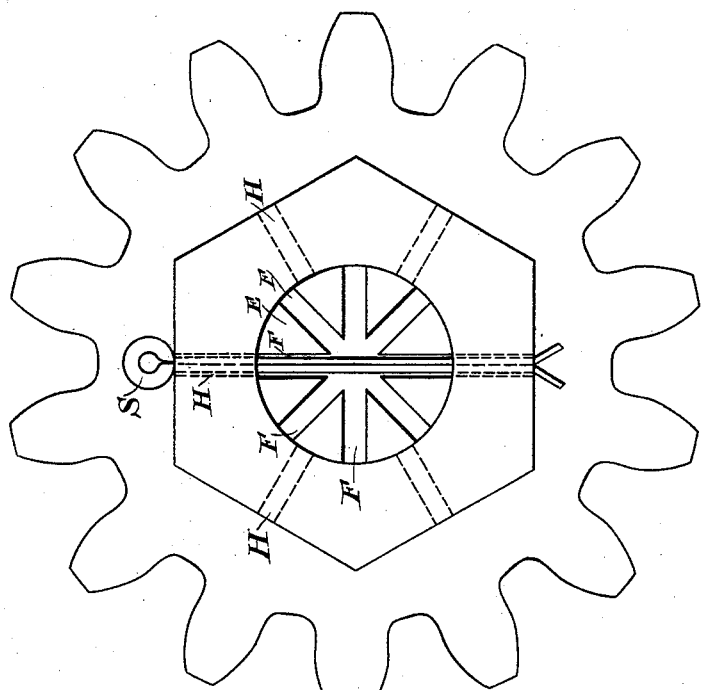
Figure 1:
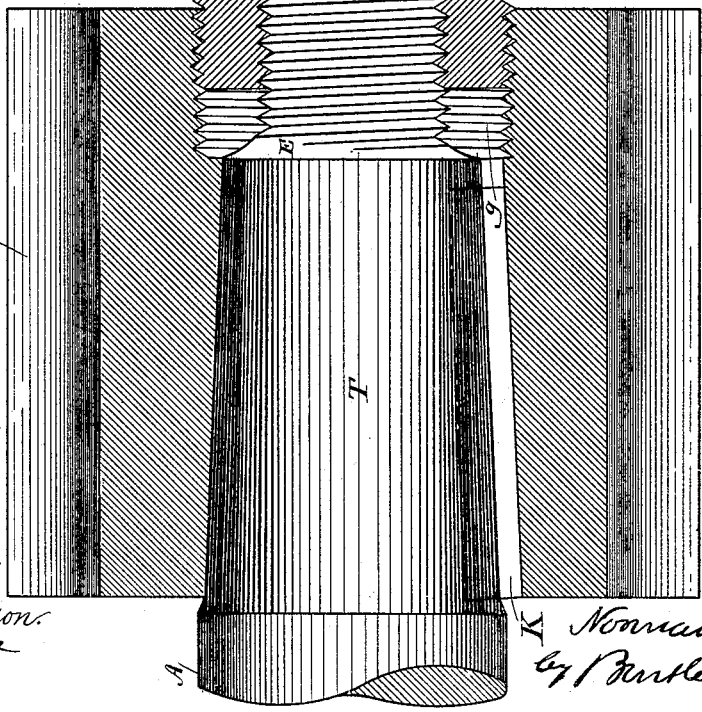

In the accompanying drawings, Figures 1 and 2 are respectively an axial section and an end elevation of a pinion and shaft with my differential fastening-nut.

The shaft A, which may be of any suitable form at its other end, is tapered at one end, as at T, to receive the pinion or gear G, which is bored or reamed, so as to fit accurately on this tapered portion. The extreme end E of the shaft is provided with a screw-thread $e$ of, say, seven threads to the inch. The gear is also provided with an interior screw-thread $g$ of, say, eight threads per inch, and in both the shaft and gear are made key-seats for receiving the key K, which prevents the gear from turning on the shaft. A differential nut N has interior and exterior screw-threads respectively pitched to correspond to and engaging with the screw-threaded end of the shaft and the interior screw-thread of the gear. The screw-threaded portion E has four grooves F in its end, passing through it diametrically to the depth indicated by dotted lines. Three slots or holes H are made diametrically through the nut N, and a pin or split key S is passed through one of these slots in the nut and shaft to lock the nut in place.

The method of putting this device together is as follows: The gear G is placed on the taper T of the shaft A nearly up to its final position, which is fixed by a mark. The key K having been put in place, the nut is screwed onto the end E, and is brought up to the gear G and caused to engage with the interior threads thereof. Then by further turning the screw it will engage and move on both threads at once, and as the shaft screw-thread is more rapid in operation than the gear screw-thread, there will be a differential movement of the gear endwise on the shaft, which movement may be made as slow, and therefore as powerful, as desired, by proper relation of the threads. Having thus forced the screw up to the desired point, the nut is locked in place by passing the pin S through slots F and H, the arrangement of said slots giving, as is evident, a locking position for every one twenty-fourth of a turn. To withdraw the pinion from the shaft it is simply necessary to remove the locking-pin and unscrew the nut N, which will then slowly and powerfully draw the nut off the shaft by the same differential action as described above.

The object of the key K is twofold. It helps to transmit the torque when the gear is in operation, and it holds the gear to an endwise movement, as is requisite for the operation of the differential nut.

What I claim as new, and desire to secure by Letters Patent, is—

1. A device for fastening a gear or torque-transmitter to a shaft, consisting of a key engaging with the gear and the shaft, and a differential nut having screw-threads of different pitch engaging, respectively, with screw-threads on the gear and the shaft, substantially as described.

2. The combination of the tapering shaft, the correspondingly-bored gear keyed on said shaft, and the differential nut engaging with the shaft and with the gear by screw-threads of different pitch, as described.

3. The combination of the tapering shaft, the correspondingly-bored gear keyed on said shaft, a differential nut engaging with the gear and with the shaft by screw-threads of different pitch and provided with a nut-lock, substantially as described.

In testimony whereof I have hereunto set my hand this 16th day of March, 1891.

NORMAN C. BASSETT.

Witnesses:
JOHN W. GIBBONEY,
BENJAMIN B. HULL.